Nov. 10, 1959          O. A. HALLSTROM, JR          2,912,236
                       DOOR CONTROL MECHANISM
                         Filed May 27, 1957

INVENTOR.
Olof A. Hallstrom, Jr.
BY
Ramey & Kalish
Attys.

United States Patent Office 2,912,236
Patented Nov. 10, 1959

2,912,236

DOOR CONTROL MECHANISM

Olof A. Hallstrom, Jr., Tillamook, Oreg.

Application May 27, 1957, Serial No. 661,819

1 Claim. (Cl. 268—50)

This invention relates to an improved door and closure mechanism therefor for use with milking stalls, operable when arranged with a stall to permit an operator to open or close the stall as desired, thereby enabling a cow to enter the stall.

In producing quality milk, dairy regulations limit the number of cows permitted in a stall at any given time as well as the number of cows in the barn or parlor housing the stalls. For instance, in producing grade A milk, commonly only one cow is allowed in a stall during milking of the cow, a subsequent cow not entering the stall until the preceding cow has been milked and left the stall. Thus, it is the requirement of milking parlors or barns that door mechanism be provided permitting the selective entrance of cows determined by the will of the operator.

In constructing door mechanism of the type contemplated, it has been found that a number of requirements must be met if the mechanism is to be practical and satisfactory. Cows, for one thing, are temperamental animals and must be handled with care in order to insure maximum milk production. Further, not all cows are alike, each cow having its individual temperament and personality. It is these characteristics which have rendered power-actuated doors with automatic controls tripped by movement of a cow unsatisfactory. Although some cows may be trained to perform in the manner required to operate such a control system, others cannot be so trained, and this has rendered most automatic systems inoperative in practice. Further, manually selected power-actuated doors have not been too successful, either by reason of a slow response to actuation tending to frighten or injure the cows, or lack of sufficient control over the operation of the door. For these reasons, many dairymen have had to resort to manually actuated sliding doors for regulating the movement of cows in a milking parlor by reason of the fact that these manually actuated doors have tended to be the only ones proven to be satisfactory in practice.

Obviously, manually actuated doors in comparison to power-actuated doors have the serious drawback of greatly increasing the work required in a dairy operation, in addition to being slow, and greatly restricting the freedom of the milker who must, in order to pull open the door, situate himself in one given location depending upon the design of the parlor or barn. This has had the effect of limiting the design and construction of milking parlors and the efficiency with which the milking parlor may be run.

Generally, it is an object of this invention to provide an improved door mechanism for milking barns or parlors which is power actuated, thereby eliminating the manual labor required of manually actuated doors yet which conforms to the temperament and milk habits of the ordinary cow, enabling the door mechanism to be used with a herd of cows without upsetting selected cows and without the necessity of special training for the cows.

Another feature of the door mechanism of the present invention is that it is remotely controlled so that it enables an operator to open the door from a number of various remote points. This has functioned to increase the variety of designs possible in a milking parlor as by means of this invention, an operator may move to different positions, depending upon the stage of the milking operation which is going on, and still be in a position to open the door.

In conceiving the present invention, it has been observed that many cows can not be trained to pass through tripping devices. Also it is a fact that cows vary in size. Another factor is that cows do not proceed steadily toward a milking stall in an orderly fashion but rather tend to bunch up or straggle out. It has been observed, for instance, that it is next to impossible to close a door directly behind a cow so as to prevent a succeeding cow from following the cow into a stall. According to this invention, the door of a stall is opened only wide enough to enable a cow to put her head and forequarters past the door. The cow herself then further opens the door against a biasing arrangement operable to urge the door against the cow but not so strong as to harm the cow in its progress. After the door has initially been partially opened, the door is free to slide to-and-fro following the contour of the cow's body as it progresses past the door into the stall, the door sliding off the cow's rear flanks and closing before a succeeding cow has a chance to enter the stall.

The motor means used for pulling the door from its closed position is a vacuum operated piston-cylinder which may be connected to the usual subatmospheric lines present in a milking parlor. The stroke of the piston-cylinder only partially opens the door. An essential feature of this invention is that the piston of the piston-cylinder be connected to the door by a flexible power transmitting means or line, such as a rope or cable, operable to transmit tension imparted to the line but absorbing without transmitting a compressive force exerted thereon. As noted above, the door is only partially opened, and the cow fully opens the door by wedging past it. The flexible connection between the motor and the door enables the door to slide freely without any resistance being offered by the piston-cylinder as would be the case if a rigid push rod or pitman were used connecting the motor to the door. Not only does the flexible line permit a cow to open the door from its partially opened position, but it also enables the cow to move the door ahead of the pull exerted on the door when the line is tensioned by operation of the piston-cylinder.

The subatmospheric pressure or so-called vacuum operated piston-cylinder used for pulling the door open is characterized by a number of novel features. In a vacuum-operated motor, the pressure differential which may be employed for driving the motor is limited, of course, by atmospheric pressure. For this reason, it is quite important that the connections between any valve controlling the motor and the interior of the piston of the motor be as short as possible if a rapid response is to be achieved in the piston-cylinder. This invention contemplates a piston-cylinder motor wherein the control valve for the motor regulating the vacuum is located directly behind the piston for the motor in the cylinder for the motor. The control valve itself is characterized by an extremely simple construction wherein a minimum number of parts are employed, a factor contributing to the efficiency, long life, and economy of the valve. To enable the motor to be remotely controlled, the valve is regulated by electrically energized means with control leads running to various locations spaced about the stall.

The biasing means closing the door against the sides of a cow preferably is activated by the force of gravity, as this force is constant irrespective of the displacement of the door. The gravitational pull on the door may be adjusted by regulating weights attached to the door or by adjusting the slant of an inclined track on which the door is mounted. Whereas the resiliency of springs varies depending upon the amount of their deformation, a gravity-biased door is urged to its closed position under a force of constant magnitude.

These and other objects and advantages are attained by the present invention described hereinbelow in conjunction with the accompanying drawings wherein.

Figures 1, 2, 3, 4:
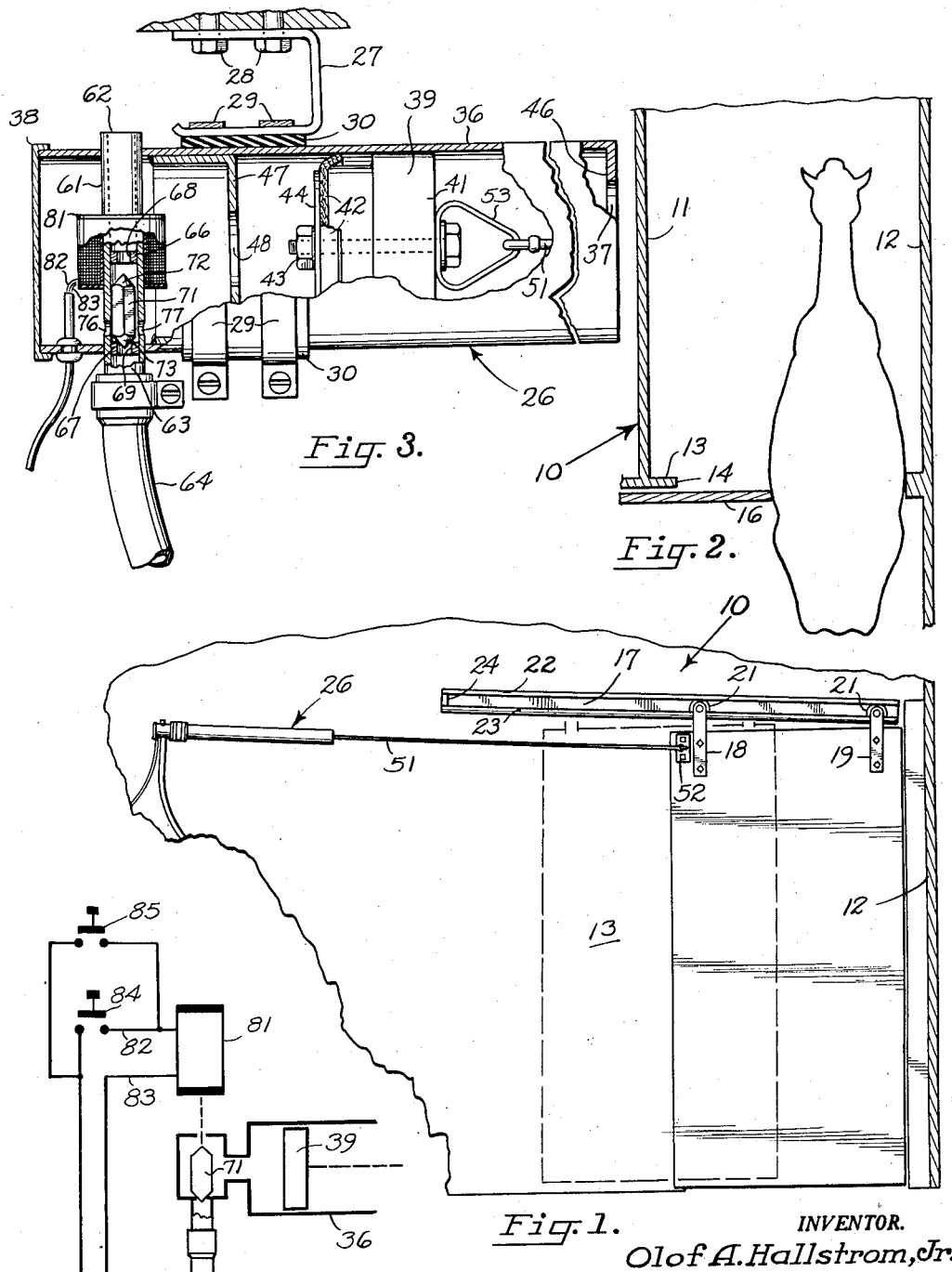
Fig. 1 is a side view of a milking stall having a door slidably mounted over the entrance thereof and means for opening the door as contemplated by this invention.
Fig. 2 is a top view of a milking stall, partially broken away, illustrating a cow passing through the entrance to the stall in the manner of this invention.
Fig. 3 is a side view, partly in section, showing details of the piston-cylinder and control means employed.
Fig. 4 is a schematic showing of the electric circuit used for regulating the vacuum jack.

Referring now in particular to the drawings for a more detailed description of an embodiment of this invention, 10 indicates generally a stall of a milking parlor or barn having side walls 11 and 12, and a front wall 13. An opening 14 is formed in front wall 13 forming the entrance to the stall. The entrance is closed by a sliding door 16.

Door 16 is mounted for sliding movement in a path between an open position, wherein the entrance to the stall is fully opened, and a closed position, wherein the entrance is closed. The closed position of the door is illustrated by the solid lines in Fig. 1. Referring to Fig. 1, the door is dependently supported on an inclined track 17 by a pair of roller mounts 18 and 19. Each of the roller mounts rotatably carries at its upper end a roller 21. Rollers 21 ride within track 17 and are retained within the confines of the track in a conventional manner as by flange portions 22 and 23. At the left hand end of the track, as viewed in Fig. 1, is an abutment 24 limiting movement of the door to the left in Fig. 1. The door, when left hand roller 21 in Fig. 1 strikes abutment 24, is in a fully opened position. Track 17 is inclined at a sufficient angle to insure that the door will fully close by gravity when the motor means pulling the door open is released. The incline of the track is maintained at a slight enough angle so that the door does not unduly harm or injure animals wedging their way past the door.

Mounted in any suitable manner on front wall 13 adjacent the entrance to the stall is a single acting, vacuum operated piston-cylinder or jack indicated generally at 26. The jack may be secured to the wall as by U-shaped clamp 27 fastened to the wall by screws 28 and affixed to the jack by means of clamps 29 tightened about one end of U-shaped clamp 27 and a sleeve 30 encircling the body of jack 26.

Referring now in particular to Fig. 3 for a more detailed discussion of jack 26, the jack comprises a cylinder 36 having an opening 37 at one end thereof and closed at its other end as by cap 38. Slidably mounted for reciprocation within the cylinder is a piston 39. This piston, as illustrated in Fig. 3, includes a core 41, which may be made of wood, and a leather cup 42 affixed to one end of core 41 as by nut and bolt assembly 43 and washer 44. The peripheral edge of leather cup 42 rides against the interior of cylinder 36 forming a substantially fluid-tight contact between the piston and the interior walls of the cylinder. Piston 39 reciprocates within the cylinder between limit positions defined by annular flange 46 inturned at the opened end of the cylinder and a piston-stop or abutment means 47 adjacent the closed end of the cylinder. Stop 47 may, as shown, take the form of a U-shaped bracket with the edges of the bracket secured to the interior of the cylinder and containing an aperture 48 therein adapted to receive the end of nut and bolt assembly 43.

Interposed between piston-cylinder or jack 26 and door 16 is a flexible power transmitting means or line 51. One end of line 51, which may take the form of a rope or cable, is affixed to the door as by bracket 52, and the other end of the line is affixed to piston 39 as by loop 53 secured to the piston by nut and bolt assembly 43. Line 51 is tensioned by movement of the piston to the left in Figs. 1 and 3 and, when tensioned, pulls door 16 from its closed position towards its opened position. However, the stroke of piston-cylinder or jack 26, which is defined by flange 46 and rear abutment 47, is selected so that in moving between these two positions, the door is only partially opened. When piston 39 is moved against abutment 47, door 16 occupies the position generally shown in dotted lines in Fig. 1.

In this condition of the parts, the door is opened wide enough to permit an animal to thrust its forequarters into stall 10, with the door 16 sliding against the animal. As the animal progresses through the stall entrance, the door moves to-and-fro towards its open and closed positions, following the contour of the animal's body. When the door is urged open, the door slides upwardly on inclined track 17 against the force of gravity. By the construction wherein the door is only partially opened by jack 26, a means is provided for preventing more than one animal at a time from entering the stall should two animals be coming toward the stall side by side.

In practice, jack 26 is first actuated to pull the door open enough to permit an animal to move into the stall. The jack is then deactuated, and the door rides against the contours of the animal's body as it progresses past the door. When the animal has fully entered the stall, the door rides around the rump of the animal to close behind the animal before a succeeding cow may enter the stall.

Flexible line 51 enables free movement of the door from its partially opened position towards its fully opened position under the urging of an animal moving past the door without the door being impeded by the operation of jack 26. Further, the flexible connection permits the door to open ahead of the pull exerted on the door by the jack and line 51.

Jack 26 is vacuum operated since milking parlors generally are equipped with a source of subatmospheric pressure to operate the milking machines used therein. The limited pressure differential available in a vacuum operated jack requires that the jack be constructed with close attention paid to minimizing the length of the fluid pressure connections between the valve for the jack and the interior of cylinder 36 in order that fast and rapid operation of the jack be obtained. To this end, jack 26 is constructed with a control valve regulating the fluid pressure for the jack located directly behind abutment 47 and inside cylinder 36. The valve is electrically operated and is remotely controlled by making or breaking a suitable electric control circuit. By the combination of a vacuum operated motor and the remotely controlled, electrically operated valve, therefore, considerable flexibility is permitted the operator in moving around the milking parlor during the milking of cows.

Referring to Fig. 3, extending through the closed end of the jack is a hollow conduit 61. Conduit 61 has an opened end 62 opened to the atmosphere and an end 63 adapted to be connected to a source of vacuum. The vacuum source, in Fig. 3, is illustrated by flexible hose 64.

Spaced within the interior of conduit 61 are a pair of valve seat portions 66 and 67, respectively. These are sealed to the interior of conduit 61 and each have extending through their centers valve bores or ports 68 and 69, respectively. Slidably mounted for reciprocation between valve seat portions 66 and 67 is an elongated valve element 71. The valve element has tapered ends 72 and 73 adapted to seat in the valve bores of each of the valve seat portions. The body of valve element 71 has a square cross-section which is diminished in area from the cross-section of the interior of the conduit between seat portions 66, 67, enabling the passage of air around the valve element irrespective of the position of the element.

Intermediate valve seat portions 66 and 67 is a pair of passages 76 and 77 forming a passage means connecting the interior of conduit 61 to the interior of cylinder 36.

An electrically energized coil 81 surrounds conduit 61, and leads 82 and 83 are provided for energizing the coil. Referring to Fig. 4, these leads may be connected to an electrical source and the coil energized by any suitable means as by push button two-point make switches 84 and 85.

The operation of the vacuum operated jack is as follows: When coil 81 is energized by closing either switch 84 or switch 85, valve element 71 moves upwardly in Fig. 3 with the upper tapered end 72 thereof seating in valve port 68. In this condition of the parts, the lower end of conduit 61, which is connected to a vacuum source, is opened to passages 76 and 77 so that the interior of cylinder 36 is evacuated. This results in movement of piston 39 to the left in Fig. 3, tensioning line 51. When the switch is opened, breaking the connection for coil 81, the vacuum within hose 64 on the lower end of conduit 61 serves to pull the valve element downwardly in Fig. 3 so that lower tapered end 73 thereof seats in valve port 69. Also, port 68 will be opened by movement of valve element 71. In this condition of the parts, the source of vacuum is sealed off from the interior of cylinder 36, and the interior of the cylinder is opened to the atmosphere via around the sides of valve element 71, valve port 68, and the upper open end of conduit 61. Piston 39 is then free to move to the right in Figs. 1 and 3 under the urging of line 51 and door 16, which is pulled by gravity to its closed position.

It will be appreciated that a number of features have been combined in the organization of applicant's invention to produce a novel operation which is well suited for most cows. When a cow nears door 16 to the stall, the operator depresses one of the electric switches to open the door under the impetus of jack 26. The door opens practically simultaneously with depressing the switch by reason of the fact that the valve controlling the jack is located directly behind abutment 47. Once the cow has entered the stall and is progressing therethrough, the operator may release switch 84. Door 16 then slides about the animal in the manner described above. When the cow finally enters the stall, the door automatically closes behind its rear end, preventing another cow from following suit. Movement of a cow past door 16 is not retarded by a pumping action occurring in jack 26 by reason of the flexible connection afforded by line 51.

The jack or piston-cylinder and control means therefor of this invention are extremely simple and practical. The parts employed are easily repaired using tools ordinarily found in a dairy operation. The entire organization has been found to greatly increase the speed with which a herd of cows may be handled.

It is claimed and desired to secure by Letters Patent:

Door mechanism for a milking stall comprising a door for said stall slidably mounted for movement between open and closed positions opening and closing said stall, respectively, biasing means constantly urging said door to its closed position, a cylinder having an open and a closed end fixed to said stall, a piston reciprocating within said cylinder, a flexible line interposed between said piston and said door connecting said piston and door, tensioning of said line by movement of said piston toward the closed end of said cylinder being operable to pull said door toward its open position against the thrust of said biasing means, the tension of said line being proportioned and arranged to produce partial opening of the door only to an extent sufficient to enable an animal partially to enter said stall, thus restricting entrance to said stall to one animal at a time, conduit means extending vertically through said cylinder adjacent its closed end connected at an upper end to the atmosphere and at a lower end to a vacuum source, a pair of valve seat portions within the interior of said conduit means and vertically spaced one from the other, passage means intermediate said valve seat portions connecting the interior of said cylinder, a valve element slidably mounted within said conduit means intermediate said valve seat portions for movement between said valve seat portions, the vacuum of said vacuum source seating said valve element on one of said valve seat portions, thereby to shut off the vacuum from said passage means and open said passage means to the atmosphere, and remotely controlled, electrically operated means operable when energized to seat said valve element on the other of said valve seat portions, thereby to connect the vacuum source with said passage means and shut off the atmosphere from said passage means.

References Cited in the file of this patent

UNITED STATES PATENTS

| 1,289,306 | Thompson | Dec. 31, 1918 |
| 1,529,434 | Hynes | Mar. 10, 1925 |
| 1,544,751 | Haynes et al. | July 7, 1925 |
| 2,194,782 | Baade | Mar. 26, 1940 |
| 2,267,515 | Wilcox et al. | Dec. 23, 1941 |
| 2,755,080 | Huner | July 17, 1956 |

FOREIGN PATENTS

| 685,216 | France | Mar. 31, 1930 |